United States Patent
Li et al.

(10) Patent No.: US 10,289,570 B2
(45) Date of Patent: May 14, 2019

(54) DETECTING DATA CORRUPTION BY CONTROL FLOW INTERCEPTIONS

(71) Applicant: McAfee, LLC, Santa Clara, CA (US)

(72) Inventors: Xiaoning Li, Hillsboro, OR (US); Lixin Lu, San Jose, CA (US); Ravi Sahita, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 96 days.

(21) Appl. No.: 14/998,201

(22) Filed: Dec. 24, 2015

(65) Prior Publication Data

US 2017/0185536 A1 Jun. 29, 2017

(51) Int. Cl.
| | |
|---|---|
| G06F 12/14 | (2006.01) |
| G06F 21/56 | (2013.01) |
| G06F 21/62 | (2013.01) |
| G06F 3/06 | (2006.01) |
| G06F 9/30 | (2018.01) |
| G06F 9/38 | (2018.01) |
| G06F 11/00 | (2006.01) |
| G06F 21/53 | (2013.01) |

(52) U.S. Cl.
CPC ........ *G06F 12/1458* (2013.01); *G06F 3/0622* (2013.01); *G06F 3/0631* (2013.01); *G06F 3/0673* (2013.01); *G06F 9/3005* (2013.01); *G06F 9/3804* (2013.01); *G06F 11/00* (2013.01); *G06F 21/53* (2013.01); *G06F 21/566* (2013.01); *G06F 2212/1052* (2013.01)

(58) Field of Classification Search
CPC .. G06F 12/1458; G06F 3/0622; G06F 3/0631; G06F 3/0673; G06F 21/566; G06F 21/6218; G06F 2212/1052
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,301,699 B1 | 10/2001 | Hollander et al. | |
| 6,460,050 B1 | 10/2002 | Pace et al. | |
| 6,832,302 B1 * | 12/2004 | Fetzer | G06F 21/52 |
| | | | 711/154 |
| 7,506,155 B1 | 3/2009 | Stewart et al. | |
| 9,069,970 B2 * | 6/2015 | Christodorescu | G06F 21/57 |

(Continued)

FOREIGN PATENT DOCUMENTS

WO 2017112273 A1 6/2017

OTHER PUBLICATIONS

International Search Report and Written Opinion in International Application No. PCT/US2016/063439, dated Mar. 6, 2017, 12 pages.

(Continued)

*Primary Examiner* — Yonas A Bayou

(74) *Attorney, Agent, or Firm* — Patent Capital Group

(57) ABSTRACT

Embodiments of this disclosure are directed to an execution profiling handler configured for intercepting an invocation of memory allocation library and observing memory allocation for an executable application process. The observed memory allocation can be used to update memory allocation meta-data for tracking purposes. The execution profiling handler can also intercept indirect branch calls to prevent heap allocation from converting to execution and intercept exploitation of heap memory to block execution.

19 Claims, 10 Drawing Sheets

(56) References Cited

U.S. PATENT DOCUMENTS

| | | | |
|---|---|---|---|
| 9,405,570 B2 | 8/2016 | Sahita et al. | |
| 9,563,533 B2* | 2/2017 | Agarwala | G06F 11/3632 |
| 9,762,399 B2* | 9/2017 | Ghose | G06F 9/3851 |
| 2003/0056200 A1* | 3/2003 | Li | G06F 11/323 |
| | | | 717/128 |
| 2005/0289311 A1* | 12/2005 | Durham | G06F 21/53 |
| | | | 711/163 |
| 2006/0005015 A1* | 1/2006 | Durham | G06F 21/53 |
| | | | 713/164 |
| 2007/0005572 A1* | 1/2007 | Schluessler | G06F 9/541 |
| 2009/0049550 A1 | 2/2009 | Shevchenko | |
| 2010/0064367 A1* | 3/2010 | Lysemose Hansen | |
| | | | G06F 21/54 |
| | | | 726/23 |
| 2013/0117743 A1 | 5/2013 | Neiger et al. | |
| 2014/0013326 A1 | 1/2014 | Neiger et al. | |
| 2014/0380009 A1* | 12/2014 | Lemay | G06F 12/145 |
| | | | 711/163 |
| 2015/0067763 A1 | 3/2015 | Dalcher et al. | |
| 2015/0121366 A1 | 4/2015 | Neiger et al. | |
| 2015/0213260 A1* | 7/2015 | Park | G06F 21/54 |
| | | | 726/23 |
| 2016/0094571 A1* | 3/2016 | Sahita | G06F 21/56 |
| | | | 726/23 |
| 2016/0283714 A1* | 9/2016 | LeMay | G06F 21/56 |
| 2017/0235684 A1* | 8/2017 | Wang | G06F 12/0802 |
| | | | 711/118 |

OTHER PUBLICATIONS

PCT Jul. 5, 2018 International Preliminary Report on Patentability from counterpart PCT/US2016/063439; 11 pages.

* cited by examiner

US 10,289,570 B2

DETECTING DATA CORRUPTION BY CONTROL FLOW INTERCEPTIONS

TECHNICAL FIELD

This disclosure pertains to computer security, and more particularly, to detecting data corruption by control flow interception.

BACKGROUND

Return Oriented Programming (ROP) attacks are the result of memory corruption attacks due to vulnerabilities exposed in large programs. It is complex to reduce the attack surface for a large program without recompiling the program and the loaded static and dynamic libraries (DLLs) loaded into the program.

Instrumentation-based approaches can be used only for known program entry points and do not address use of programmer-unintended gadgets in programs via the use of repurposed instructions. This makes tracking a memory corruption used in a subsequent ROP attack complex to track.

DETAILED DESCRIPTION

Figure 1:
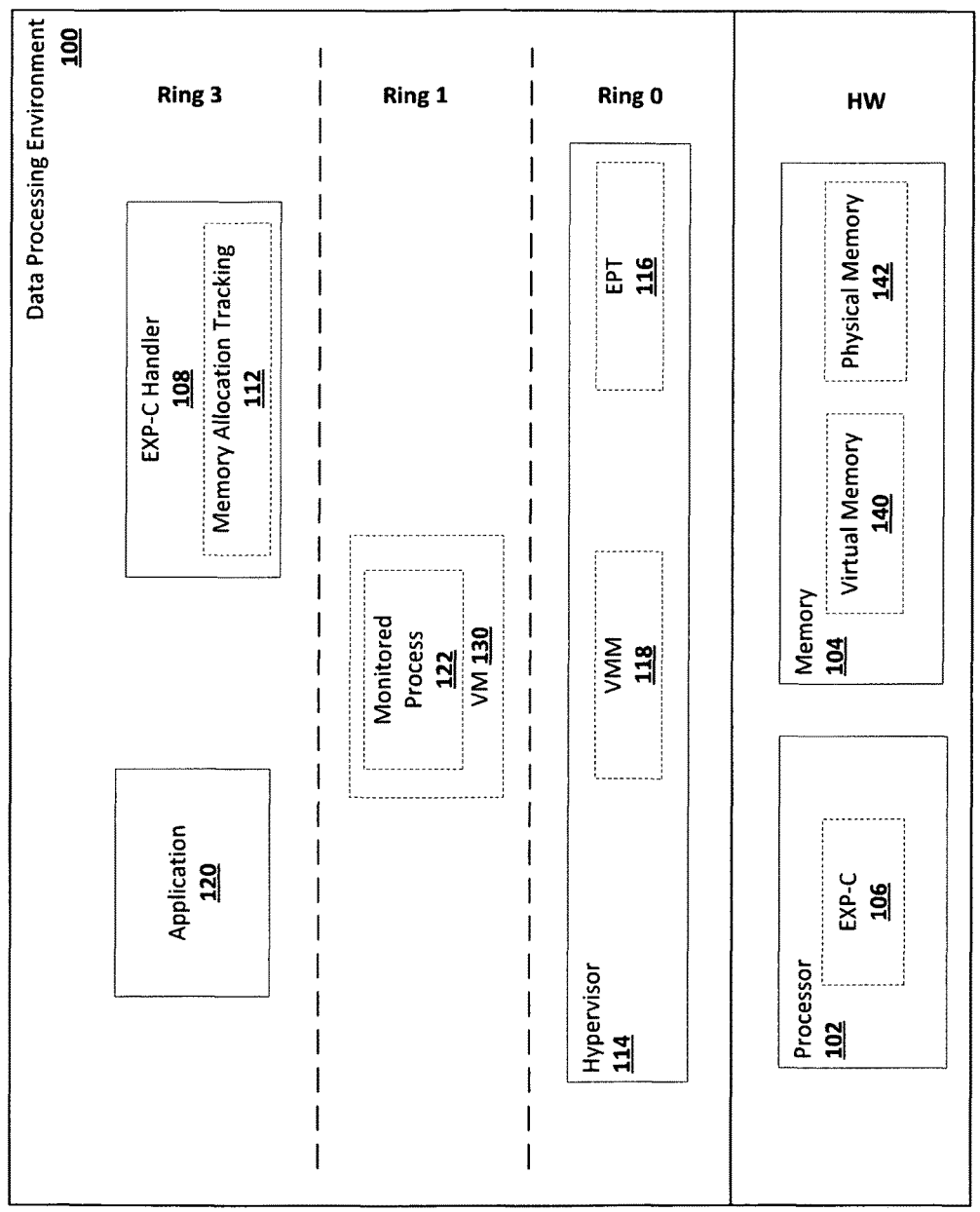
FIG. 1 is a schematic block diagram of a system for detecting data corruption by control flow interceptions in accordance with embodiments of the present disclosure.

This disclosure describes preventing the use of attacker controlled memory to leverage memory corruption attacks by using a combination of memory introspection and control-flow introspection processor capabilities. The present disclosure provides a scalable and uncircumventable mechanism to track crafted memory corruption attacks.

This disclosure uses a capability called CPU Execution Profiling (EXP-C) which allows for branch instructions executed in a target process to be monitored by redirecting these branch instructions to an in-process execution profile handler (EXP-C handler). The code of the EXP-C handler in turn is used to perform memory isolation and introspection by using CPU virtual machine function (VMFUNC) intrinsics for memory view switching and sub-page memory write protection (SPP) to be able to detect memory corruption across modules and signal a potential ROP/heap spray attack before the memory corruption is leveraged by the exploit.

Existing software-only techniques, such as EMET, Nozzle, and Bubble, use heuristics that can be fooled by randomization and stack hijacking. This disclosure provides a mechanism to block the use of the heap spray and ROP that leverages attacker controlled memory allocation/corruption, thus detecting the attack in real-time without a priori analysis.

The general idea is to use EXP-C branch interception to:
a) Intercept execution of indirect branches that enter sensitive functions, such as VirtualProtect function; and
b) Intercept execution of memory allocation and free routines, such that the heap allocations and free performed via some script interface (like JavaScript) are tracked (the tracking information is kept in protected memory.

Using these two introspection properties, the EXP-C handler ensures that:
1) A ROP based execution sequence that attempts to make a tracked memory area executable is intercepted by the EXP-C handler; and
2) If the tracked memory is still made executable, then a subsequent ROP/corrupted pointer based (indirect branch) entry into shell code is still never allowed to target a memory address that is in the tracking list of the EXP-C handler.

The two approaches together prevent an attacker from being able to execute from attacker controlled memory, thus making a precise heap spray entry harder to achieve even when using ROP gadget (i.e., machine instruction sequence) to make the memory executable (since the attacker must use an indirect branch to enter dynamically allocated memory).

This disclosure describes intercepting an indirect branch execution that invokes exported APIs across modules and execute virtual memory function (VMFUNC) on those boundary conditions in the EXP-C handler readable/writable or executable to another module in the same program. This isolation ensures that ROP gadgets from one module cannot be utilized (executed) to make memory allocated by script in a different module executable (even if VirtualProtect function is invoked by the ROP gadget—since the underlying memory remains inaccessible/non-executable). This restriction forces an attacker to use gadgets from the same sub-component that it is allocating the memory from (i.e., the script module), which further restricts the available gadget space. In this scheme, further Sub-page protection (e.g., less than 4 KB granularity, for example 128 bytes) may be used by the EXP-C handler to lower the performance impact of separating write permissions across heap allocations, and enforce non-writable guard bands in physical memory.

FIG. 1 is a schematic block diagram of a system for detecting data corruption by control flow interceptions in accordance with embodiments of the present disclosure. FIG. 1 illustrates an example computer system 100 for detecting the presence of malware in an event's processing, in accordance with certain embodiments of the present disclosure. System 100 may include hardware, including a processor 102 and memory 104. EXP-C module 106 can be integrated to the processor 102, or may be outside the processor 102 and communicatively coupled to processor 102. EXP-C module 106 can include hardware, software (e.g., microcode, firmware, etc.), or a combination of hardware and software. The system 100 also includes software, including a hypervisor 114 residing in a high privileged area (Ring 0), the hypervisor 114 managing a virtualization of an application 120 executing a process in a medium privileged area (Ring 1). The EXP-C handler 108 can also reside in Ring 1, as can applications 120 running on the system 100.

The system 100 also includes an EXP-C handler 108. EXP-C handler 108 can include code that is executed when the EXP-C module 106 redirects execution from one memory location to another (e.g., by changing the instruction pointer for the execution of an instruction to an instruction pointer for running the EXP-C handler 108). EXP-C handler 108 may be configured to execute on any suitable portion of system 100. They may be configured to execute on, for example, a server, computer, node, gateway, router, transmitter, or receiver. System 100 may be implemented by any suitable electronic device and/or combination of electronic devices, such as: computer(s), laptop(s), cloud computing server(s), blade(s), desktop(s), rack server(s), mobile device(s), and/or web server(s). In some embodiments, system 100 may be implemented by one or more microprocessor(s), microcontroller(s), application-specific integrated circuit(s), and/or other appropriate electronic devices in a system on a chip ("SoC") configuration.

In some embodiments, some or all of the functions performed by EXP-C handler 108 may be performed by one or more security agent(s). Security agents may be installed to run on a variety of electronic devices, including computers, laptops, cloud computing servers, blades, desktops, rack servers, mobile devices, and/or web servers.

In general, the EXP-C module 106 can intercept process executions at certain points to collect memory allocation tracking meta-data. For example, EXP-C module 106 can intercept an invocation by an executable application 120 process flow of memory allocation. Application 120 executes a process (here, referred to as a monitored process 122). The EXP-C handler 108 can observe all memory allocation of free routines of the executable application 120. The EXP-C handler 108 can identify memory allocation information from the observation of the memory allocation. From the memory allocation information, the EXP-C handler 108 can update allocation tracking meta-data 112. The allocation tracking meta-data 112 can include the type of module being executed, the amount of memory, the memory address(es) or memory address ranges, the location of the allocation, etc.

EXP-C module 106 can also intercept indirect branch calls and exploits to heap memory. The EXP-C handler 108 can use the memory allocation tracking meta-data to determine whether to block or allow a heap allocation conversion to execute (for indirect branch calls) and to determine whether to block or allow a heap allocation execution (for exploit).

In some embodiments, processor 102 may comprise, for example, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 104. Memory 104 may be configured in part or whole as application memory, system memory, or both. Memory 104 may include any system, device, or apparatus configured to hold and/or house one or more memory modules. Each memory module may include any system, device or apparatus configured to retain program instructions and/or data for a period of time (e.g., computer-readable storage media). Memory 104 can include physical memory 142. For running a monitored process, virtual memory 140 can be allocated and mapped to physical memory 140.

In some embodiments, system 100 may monitor execution of select activities. That is, system 100 may allow for generic runtime detection of unauthorized software. For example, system 100 may allow a user of a system 100 to determine from where a software execution flow originated and to where the execution flow may continue. In the same or alternative embodiments, system 100 may discover code involved in the handling of a traced event. For example, system 100 may discover code involved in the handling of an input-output ("I/O") event, the return from invocation of a privileged API, etc.

In some embodiments, system 100 may be configured to detect unauthorized software without the use of signatures, plugging, monitoring individual known exploits, and/or other methods of identifying malicious software based on prior knowledge of the behavior of unauthorized software. That is, system 100 may be configured to detect previously unknown versions of a piece of unauthorized software, and/or may not require frequent updating of monitoring software in response to changes to system software.

In some embodiments, system 100 may include EXP-C handler 108. EXP-C handler 108 may be configured to implement and provide execution profiling and monitoring capability. In some embodiments, EXP-C handler 108 may be implemented through hardware, software, and/or some combination thereof. For example, EXP-C handler 108 may be implemented through the use of Binary Translation techniques (or other appropriate code emulation techniques) and/or CPU hardware extensions developed for use with EXP-C handler 108. As an example of the latter, CPU extensions may be developed based on branch trapping.

In some embodiments, EXP-C 106 may be configured to invoke callbacks to EXP-C handler 108 when specified criteria are met. For example, EXP-C 106 may: invoke a callback to EXP-C handler 108 when an event to be traced is identified and/or generated, enable generation of callbacks when certain branch instructions execute (any appropriate code segment that may depend on and/or alter an execution flow at a particular point, e.g., CALL, JMP, RET); generate callbacks through binary translation (software-based and/or hardware-assisted), existing CPU Debug Break on Branch, and/or other CPU extensions; filter callbacks by an identifier (e.g., a software process ID) associated with a process and/or thread executing an instruction, wherein the identifier may be determined by an examination of CPU register contents; identify code involved in a branch (pre- and/or post-branch) while handling callbacks; check identified code for validity (e.g., a signature check, a scan for malware); check identified code for desirability (or necessity) of its inclusion in handling the traced event; and/or check for use of return-oriented programming techniques. In the same or alternative embodiments, EXP-C handler 108 may be further configured, when checking for the use of return-oriented programming techniques, to examine the call stack at a point of branch to verify whether it is legitimate or induced by return-oriented programming. An example of the ways by which this examination may be performed may be found in U.S. Pat. No. 7,987,451.

In operation, system 100 may operate to detect unauthorized software based on execution profiles rather than signatures or other static pattern matching. That is, system 100 may identify unauthorized software based on behavioral and/or runtime solutions. An approach based on execution profiling may avoid some of the disadvantages associated with other techniques. For example, unlike host intrusion prevention systems (and other behavioral approaches) that rely on API usage heuristics, execution profiling may be less susceptible to return-oriented programming attacks, hook skipping, hook tempering, etc. Execution profiling may, for example, address such attacks on a zero-day basis without requiring expensive hooking approaches. As an additional example, other types of malware identification systems may employ software fault isolation to de-privilege untrusted processes from performing certain types of system operations. However, this type of approach may not be effective on attacks on trusted and/or privileged code. In order to address these and other concerns, execution profiling may identify unauthorized software without prior knowledge or discovery of target code addresses; rather, these may be discovered during the monitoring of execution flow.

System 100 also includes a hypervisor 114 for managing virtual machine 130. Hypervisor 114 can include a virtual machine manager 118 for managing one or more virtual machines 130. The virtual machine 130 can virtualize an operational environment in which an application 120 can execute a monitored process 122. The virtual machine 130 can be isolated from the rest of the system 100 so as to act as a sandbox environment in which the monitored process 122 can be safely executed. Hypervisor 114 can include an extended page table (EPT) 116. A page table may be a data structure used by a virtual memory system to store the mapping between virtual addresses and physical addresses. The EPT 116 may also include a plurality of page tables for a plurality of virtual machines. The EPT 116 can be used to inform a no-execute command for a piece of memory or memory region. The EPT can include permissions set by the EXP-C handler 108 based on memory allocation tracking metadata 112. The permissions can determine whether the hypervisor 114 that manages the execution of the monitored process in the VM 130 permits or blocks execution of heap memory.

Hypervisor 114 can be software that manages the VM 130. The hypervisor 114 can include hardware utilization that permits direct memory accesses (e.g., to physical memory). The EXP-C handler 108 can use the EPT 116 as a mapping to the physical memory of memory access permissions, such as read and write permissions. The EPT 116 can be updated by the EXP-C handler 108 with permissions for memory accesses for the monitored process 122 based on memory allocation tracking metadata 112 observed by the EXP-C handler 108.

For example, an indirect branch can be monitored by EXP-C 106, which triggers the EXP-C handler 108. The EXP-C handler 108 includes logic that can be used to determine whether to permit or allow execution of a piece of code by determining whether that piece of code is permitted to access desired memory locations. The EXP-C handler 108 can consult the EPT 116 for memory access permissions, and to disallow memory access permissions or allocations of memory based on EPT permissions.

Sub-page protection SPP 118 can be used for fine-granularity protection. For example, the extended page protection can be done for a 4 KB granularity.

Figure 2A:
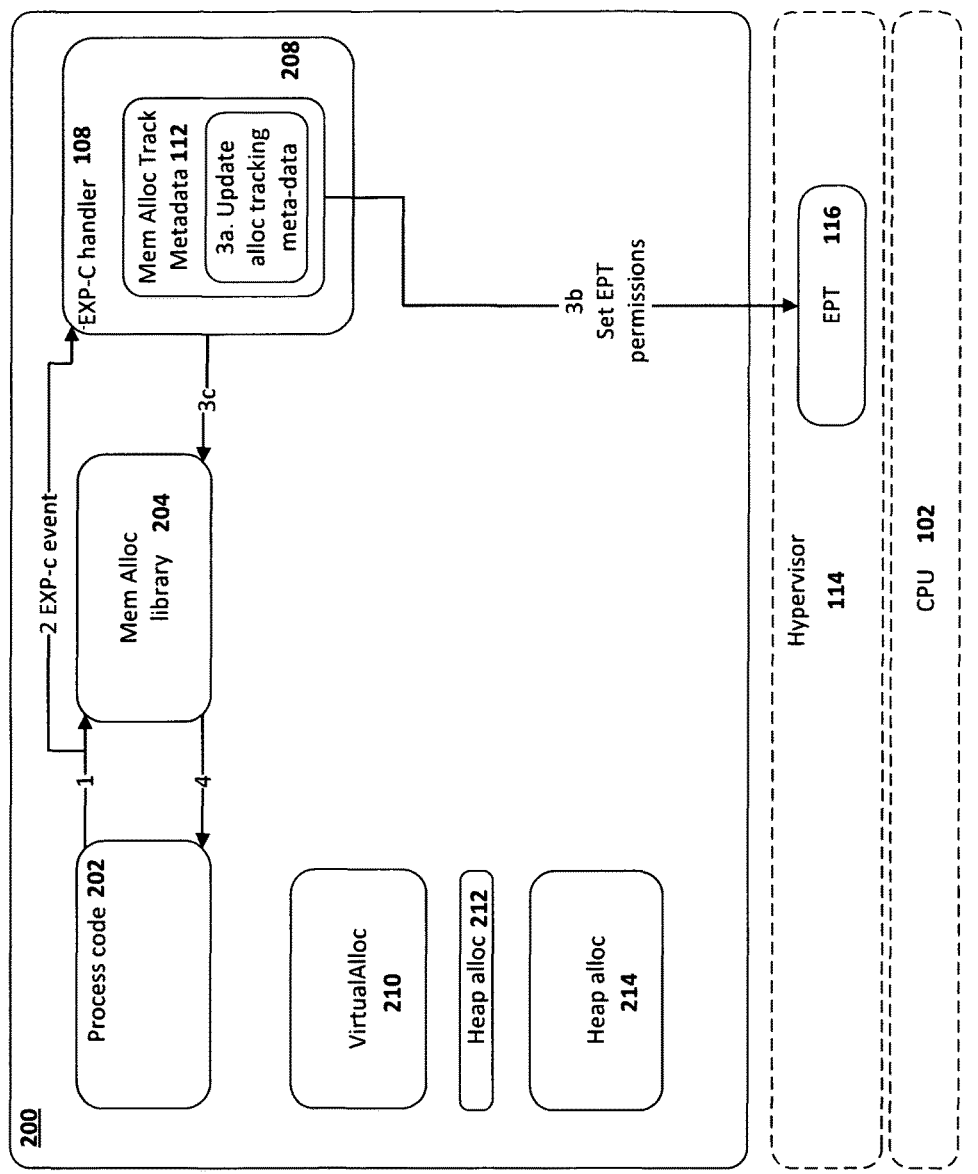
FIG. 2A is a schematic block diagram of interception points for detection data corruption in accordance with embodiments of the present disclosure.

FIG. 2A is a schematic block diagram of interception points for detection data corruption in accordance with embodiments of the present disclosure. FIG. 2A illustrates a process address space 200 in which the interception points occur during execution of process code 202.

In FIG. 2A, the process code 202 first requests memory allocation from memory allocation library 204. Memory allocation library 204 is a frontend to a virtual memory allocation. The EXP-C handler 108 can intercept the process code 202 when the process code 202 invokes the memory allocation library 204. The EXP-C handler 108 can observe all memory allocation invocations to identify memory allocation information for the process code 202. Memory allocation information can include the type of module being run, the size of the memory, the memory address(es) or ranges, the location of the memory, memory attributes, etc. Memory attributes defines the allocated memory is for, such as READ ONLY, READ and WRITE, READ and EXECUTE, etc. The EXP-C handler 108 can update allocation tracking meta-data 208. In some embodiments, the EXP-C handler 108 also sets extended page table (EPT) permissions in EPT 116 in the hypervisor 114.

The EXP-C handler 108 can use execution profiling techniques to observe the memory allocation and to identify memory allocation information. Execution profiling is discussed further in the text accompanying FIGS. 7 and 8A-B. The EXP-C handler 108 can also monitor an allocated memory attribute change event. Allocated memory attribute change events usually happen during the malware preparing itself, such as unpacking prior to executing, etc.

The process code 202 continues to run and invoke memory allocation library, and the EXP-C handler 108 continues to observe memory allocation information until the process code 202 terminates.

Figure 2B:
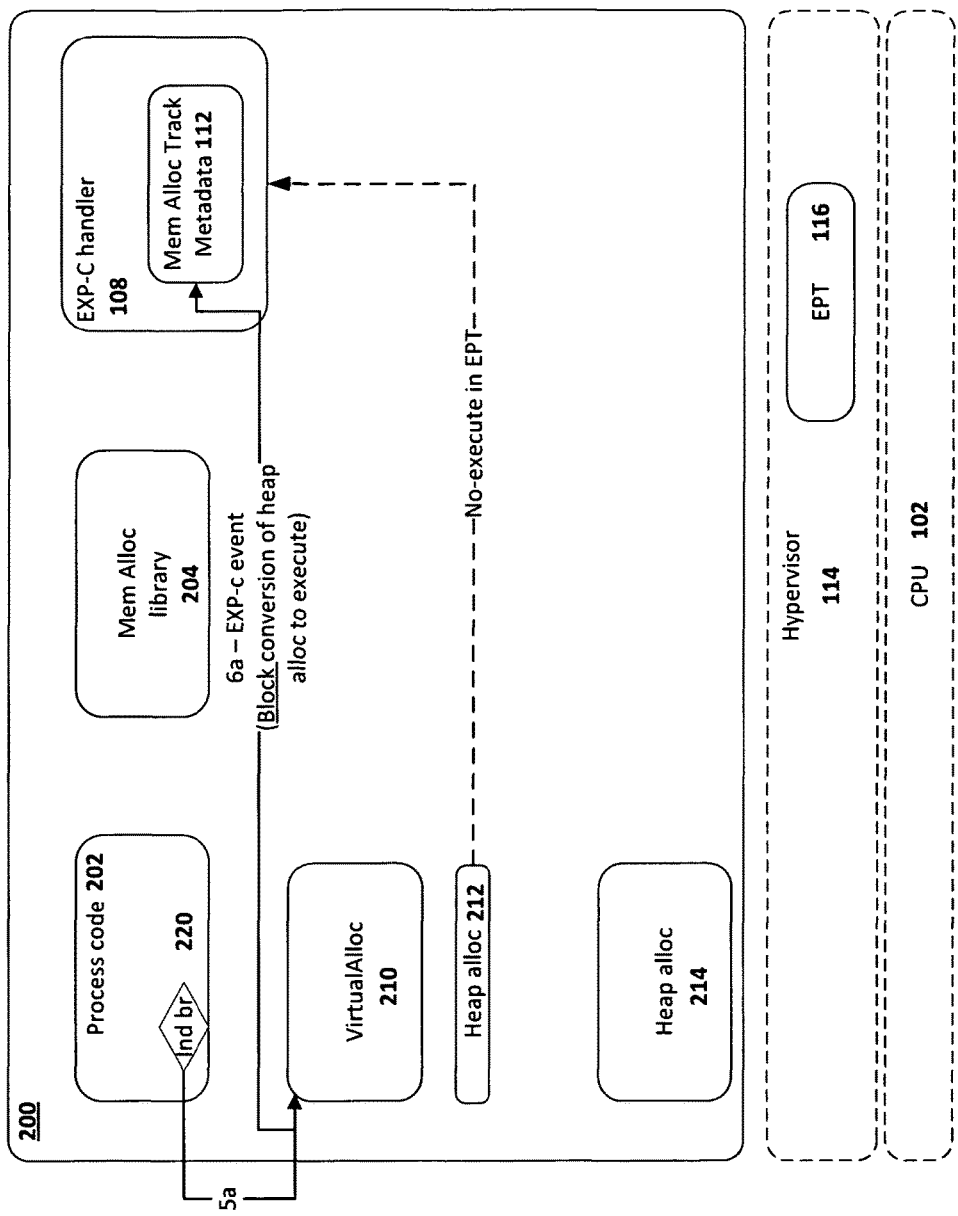
FIG. 2B is a schematic block diagram of interception points for detection data corruption in accordance with embodiments of the present disclosure.

FIG. 2B is a schematic block diagram of interception points for detection data corruption in accordance with embodiments of the present disclosure. In some embodiments, the process code may include an indirect branch call 220. The indirect branch call 220 may access virtual allocation for converting heap allocation to execute the indirect branch instructions. The EXP-C handler 108 can intercept the indirect branch to evaluate, using executing profiling of the function call, whether to block or allow conversion of heap allocation to execute the indirect branch instructions. For example, the EXP-C handler 108 can interpret the indirect branch as an EXP-C event. The EXP-C handler 108 can use the memory allocation tracking meta-data to make a determination of whether to block or allow the heap conversion. If the EXP-C handler 108 determines to block conversion, the EXP-C handler 108 returns to the process at a next logical instruction pointer without execution the indirect branch. Additionally, the EXP-C handler 108 can determine to block a heap allocation conversion by determining, based on allocation tracking meta-data, that the memory is reserved, in-use, or otherwise unavailable for the specific function or instructions associated with the indirect branch.

Figure 2C:
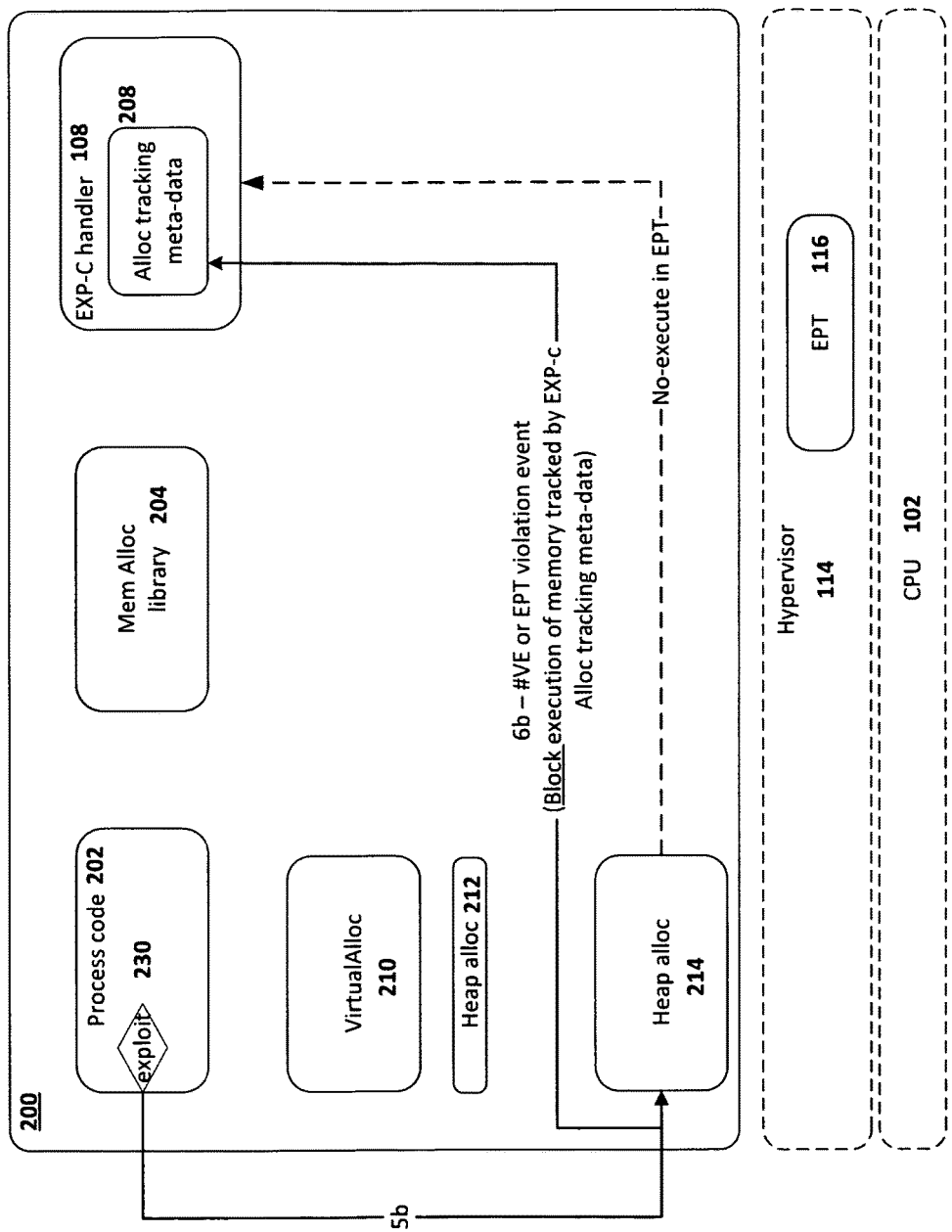
FIG. 2C is a schematic block diagram of interception points for detection data corruption in accordance with embodiments of the present disclosure.

FIG. 2C is a schematic block diagram of interception points for detection data corruption in accordance with embodiments of the present disclosure. In some embodiments, the process code 202 may include an exploit function 230. The exploit function 230 may try to execution from heap 110. The EXP-C can intercept the exploit using execution profiling (e.g., the EXP-C handler 108 can interpret the exploit as a virtualization exception or an EPT event). The EXP-C handler 108 can determine whether to block or allow the heap execution based on the memory allocation tracking meta-data 208.

In some embodiments, EXP-C handler 108 may be turned off or otherwise inactive or unavailable. To the extent that the EXP-C handler 108 has set permissions into the EPT 116 managed by hypervisor 114. The EXP-C handler 108 can block execution of memory locations based on permissions in the EPT 116.

Figure 3A:
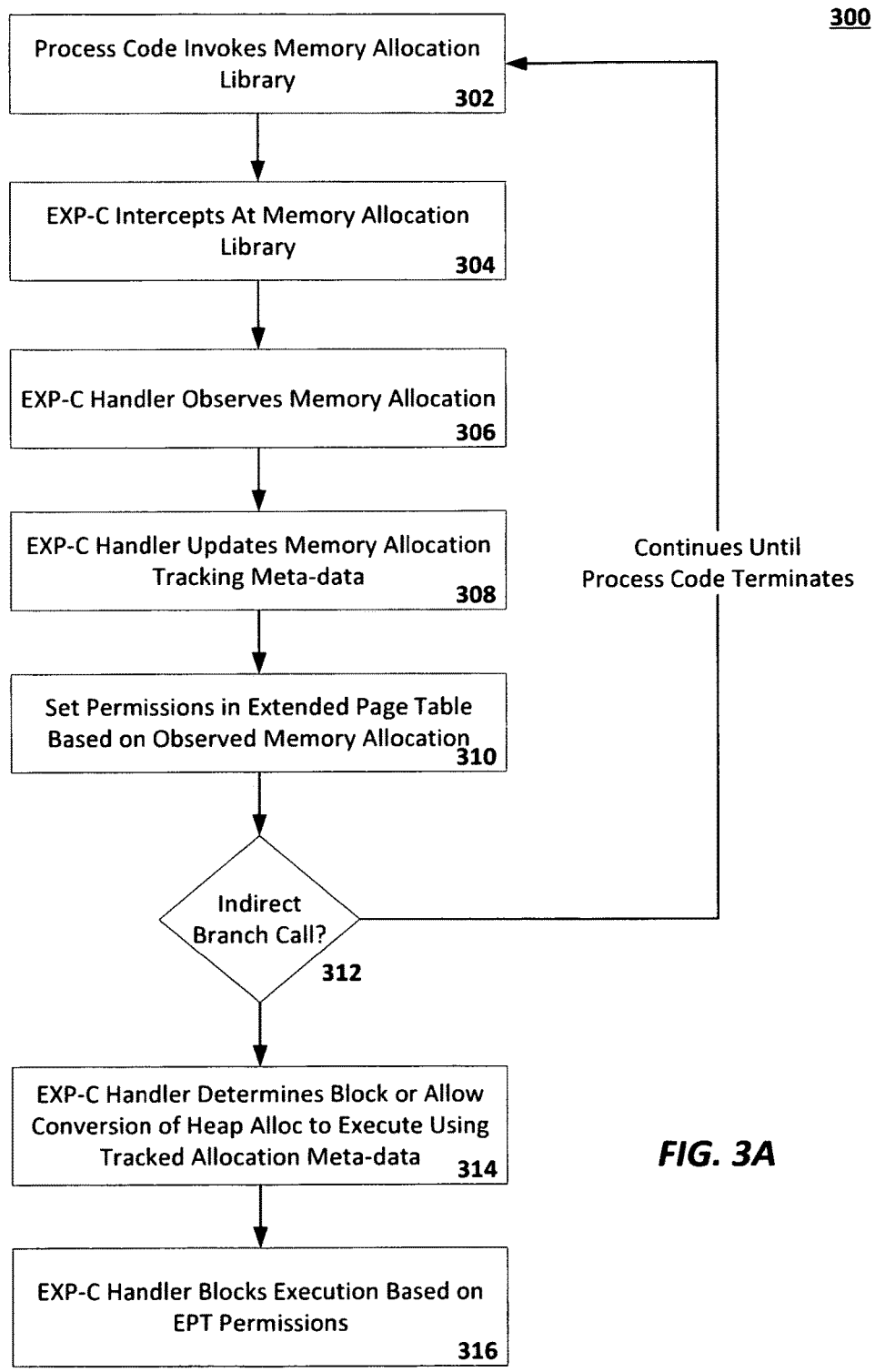
FIG. 3A is a process flow diagram for intercepting an indirect branch from converting heap allocation to execution allocation in accordance with embodiments of the present disclosure.

FIG. 3A is a process flow diagram 300 for intercepting an indirect branch from converting heap allocation to execution allocation in accordance with embodiments of the present disclosure. The process code can invoke a memory allocation library 302. The EXP-C handler can intercept the process code at the memory allocation invocation, based on execution profiling (304). The EXP-C handler can observe all memory allocation for the process code (306). The EXP-C handler can update memory allocation tracking meta-data (308). For example, the EXP-C handler can update meta-data based on observations made of the process code invocation of memory allocation. The meta-data can include size, location, address, range of memory, type of function call, etc. In some embodiments, the EXP-C handler can set permissions for the process code in the extended page, table managed by the hypervisor (310). The permissions are also based on observed memory allocations.

The process 300 can continue performing steps 302-310. The EXP-C handler can determine the presence of an indirect branch (312). The indirect branch can be treated as an EXP-C handler event. The EXP-C handler can intercept the indirect branch call and evaluate the indirect branch instructions to determine whether to block or allow the indirect branch instructions (314) from converting the heap allocation for execution. The EXP-C handler uses the memory allocation tracking meta-data to determine whether the memory locations identified in the indirect branch are available for use by the indirect branch instructions. If the EXP-C handler determines that the indirect branch should be blocked from converting heap for execution, the EXP-C handler returns to the process code at the next logical instruction pointer without executing the indirect branch instructions. In some implementations, the EXP-C handler allows the indirect branch instruction to continue but logs the behavior of the indirect branch instruction for malware behavior analysis.

In some embodiments, the hypervisor can be used to provide a no-execute instruction (316).

Figure 3B:
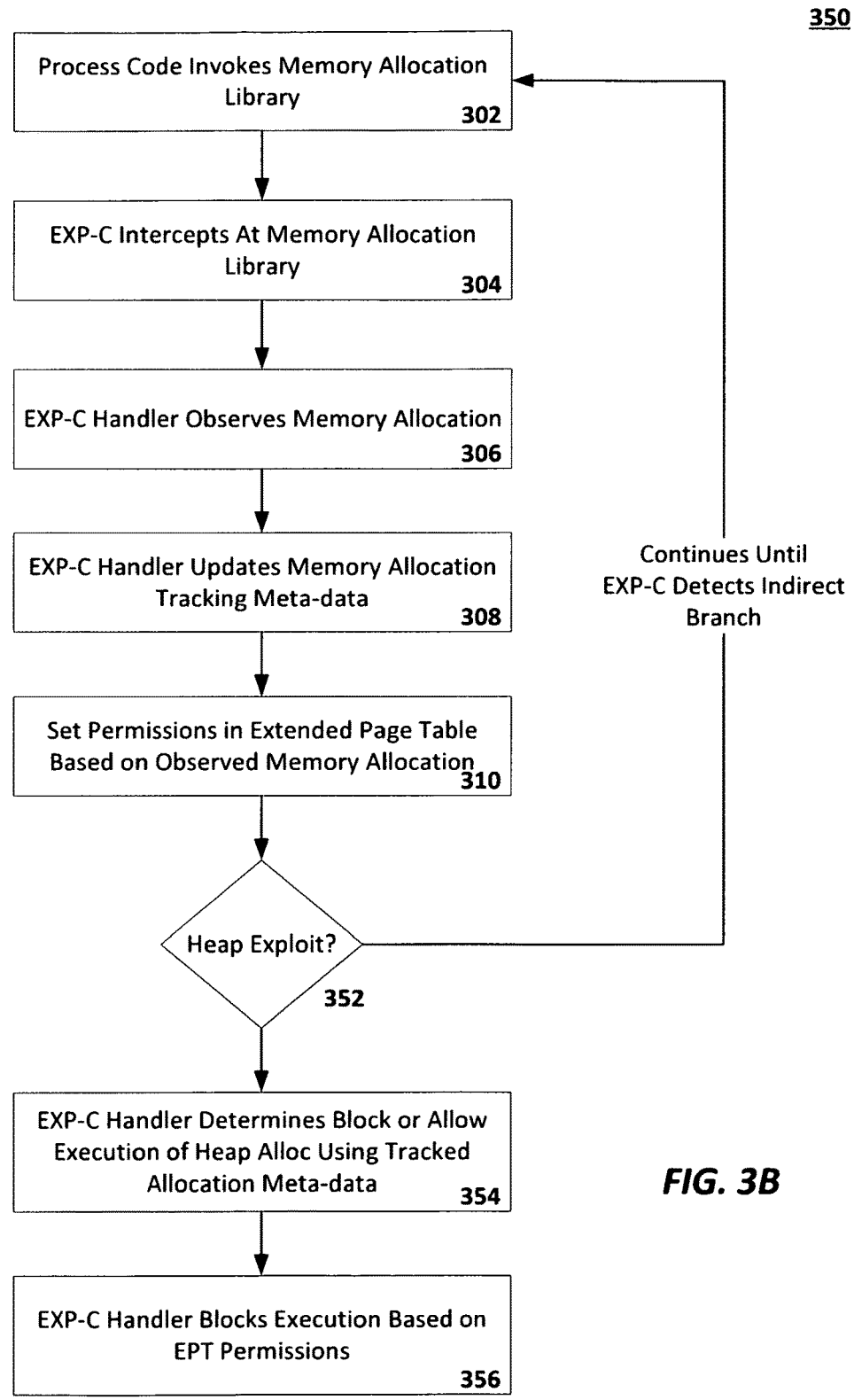
FIG. 3B is a process flow diagram for intercepting an exploit from executing in heap memory in accordance with embodiments of the present disclosure.

FIG. 3B is a process flow diagram 350 for intercepting an exploit from executing in heap memory in accordance with embodiments of the present disclosure. The process code can invoke a memory allocation library 302. The EXP-C handler can intercept the process code at the memory allocation invocation, based on execution profiling (304). The EXP-C handler can observe all memory allocation for the process code (306). The EXP-C handler can update memory allocation tracking meta-data (308). For example, the EXP-C handler can update meta-data based on observations made of the process code invocation of memory allocation. The meta-data can include size, location, address, range of memory, type of function call, etc. In some embodiments, the EXP-C handler can set permissions for the process code in the extended page table managed by the hypervisor (310). The permissions are also based on observed memory allocations.

The process 350 can continue performing steps 302-310. The EXP-C handler can determine the presence of an exploitation (352). The exploitation can be treated as a virtualization exception or as an EPT event. The EXP-C handler can intercept the exploitation and evaluate the exploitation instructions to determine whether to block or allow the indirect branch instructions (354).

In some embodiments, the hypervisor can be used to provide a no-execute instruction (356).

Figure 5:
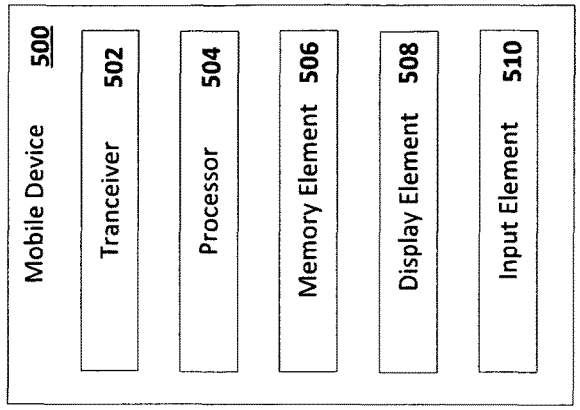
FIG. 5 is a schematic block diagram of a mobile device in accordance with embodiments of the present disclosure.
Figure 4:
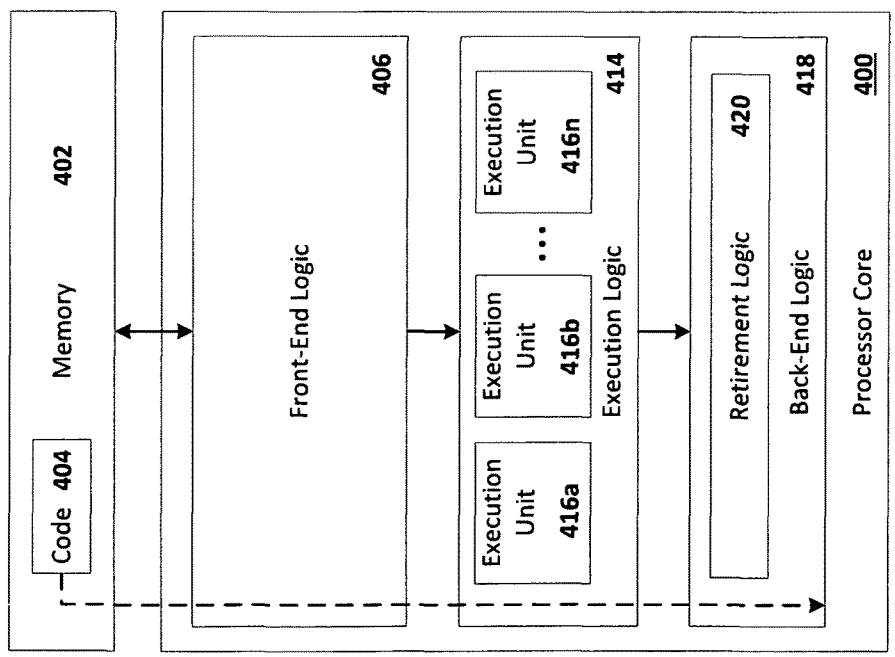
FIG. 4 is an example illustration of a processor according to an embodiment of the present disclosure.
Figure 6:
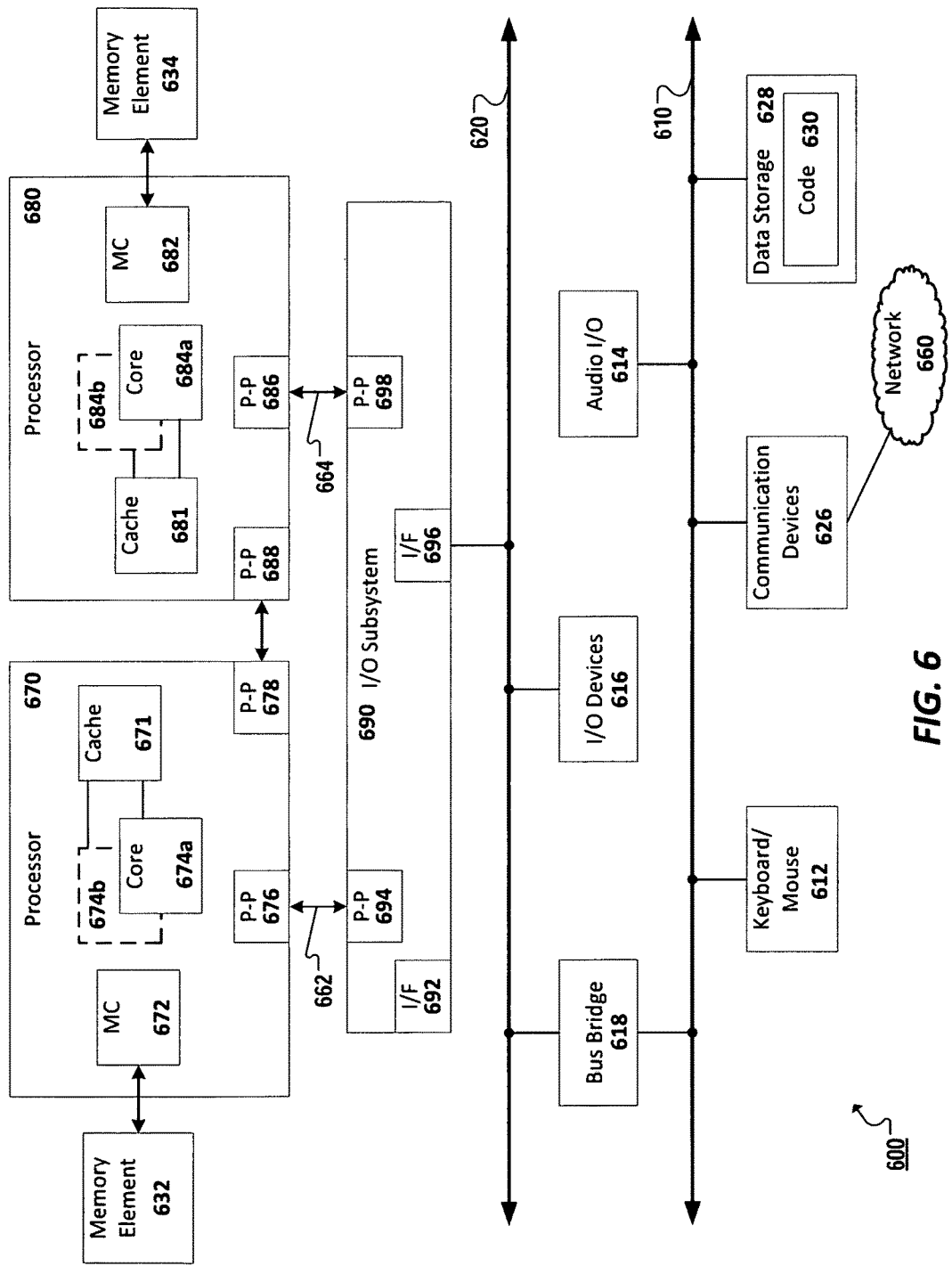
FIG. 6 is a schematic block diagram of a computing system according to an embodiment of the present disclosure.

FIGS. 4-6 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 4-6.

FIG. 4 is an example illustration of a processor according to an embodiment. Processor 400 is an example of a type of hardware device that can be used in connection with the implementations above.

Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416*a*, 416*b*, 416*n*, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

Referring now to FIG. 5, a block diagram is illustrated of an example mobile device 500. Mobile device 500 is an example of a possible computing system (e.g., a host or endpoint device) of the examples and implementations described herein. In an embodiment, mobile device 500 operates as a transmitter and a receiver of wireless communications signals. Specifically, in one example, mobile device 500 may be capable of both transmitting and receiving cellular network voice and data mobile services. Mobile services include such functionality as full Internet access, downloadable and streaming video content, as well as voice telephone communications.

Mobile device 500 may correspond to a conventional wireless or cellular portable telephone, such as a handset that is capable of receiving "3G", or "third generation" cellular services. In another example, mobile device 500 may be capable of transmitting and receiving "4G" mobile services as well, or any other mobile service.

Examples of devices that can correspond to mobile device 500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 500 illustrated in FIG. 5 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 500 includes a transceiver 502, which is connected to and in communication with an antenna. Transceiver 502 may be a radio frequency transceiver. Also, wireless signals may be transmitted and received via transceiver 502. Transceiver 502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 502 is connected to a processor 504, which may perform the bulk of the digital signal processing of signals to be communicated and signals received, at the baseband frequency. Processor 504 can provide a graphics interface to a display element 508, for the display of text, graphics, and video to a user, as well as an input element 510 for accepting inputs from users, such as a touchpad, keypad, roller mouse, and other examples. Processor 504 may include an embodiment such as shown and described with reference to processor 400 of FIG. 4.

In an aspect of this disclosure, processor 504 may be a processor that can execute any type of instructions to achieve the functionality and operations as detailed herein. Processor 504 may also be coupled to a memory element 506 for storing information and data used in operations performed using the processor 504. Additional details of an example processor 504 and memory element 506 are subsequently described herein. In an example embodiment, mobile device 500 may be designed with a system-on-a-chip (SoC) architecture, which integrates many or all components of the mobile device into a single chip, in at least some embodiments.

FIG. 6 is a schematic block diagram of a computing system 600 according to an embodiment. In particular, FIG. 6 shows a system where processors, memory, and input/output devices are interconnected by a number of point-to-point interfaces. Generally, one or more of the computing systems described herein may be configured in the same or similar manner as computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

Figure 7:
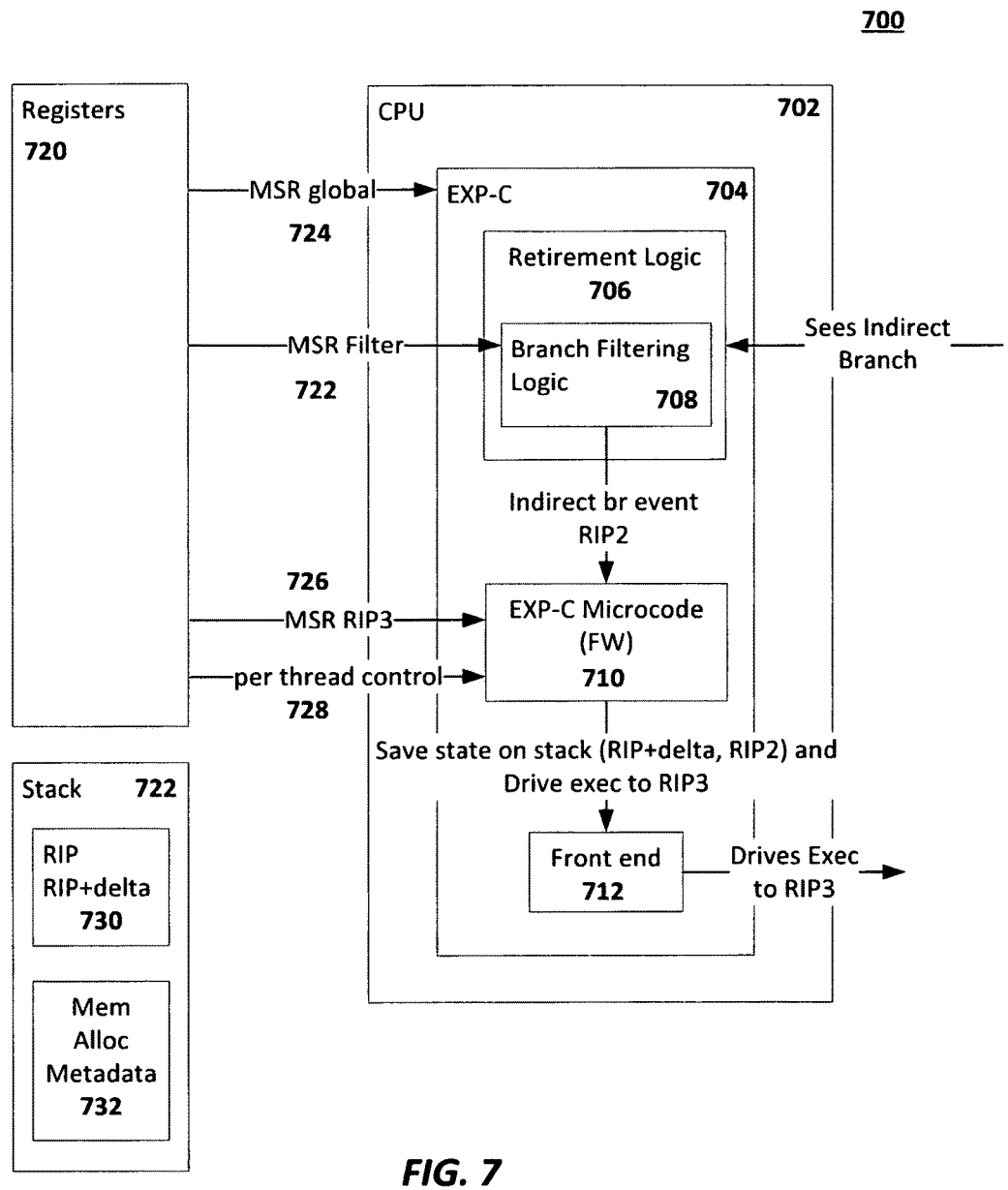
FIG. 7 is a schematic block diagram of an example hardware implementation of execution profiling in accordance with embodiments of this disclosure.

FIG. 7 is a schematic block diagram of an example hardware implementation of execution profiling in accordance with embodiments of this disclosure. FIG. 7 includes an EXP-C implementation scenario 700. EXP-C implementation scenario includes a processor 702 and a set of registers 720. The CPU includes an EXP-C logic 704 implemented at least partially in hardware. EXP-C logic 704 includes retirement logic 706, which uses branch filtering logic 708. EXP-C logic 704 also includes EXP-C microcode (firmware), though in some implementations, the EXP-C can work entirely in hardware. The CPU also includes a front end 712.

The EXP-C 704 can be enabled by a model specific register (MSR) global input from the registers set 720. The MSR global 275 input enables the EXP-C functionality in the CPU 702.

Figure 8A:
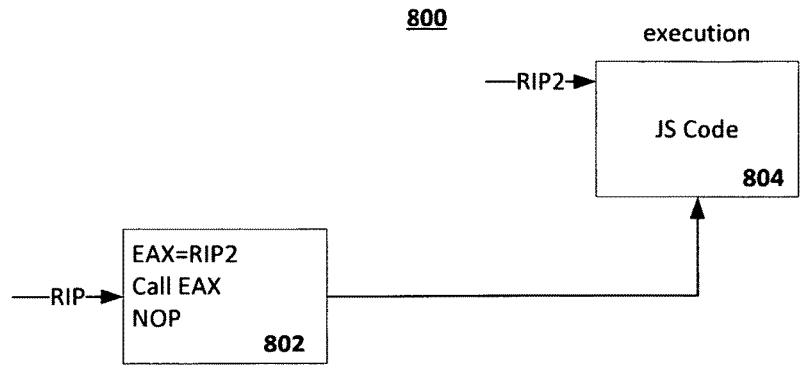
FIGS. 8A and 8B are schematic block diagrams of an example software implementation of execution profiling in accordance with embodiments of this disclosure.
Figure 8B:
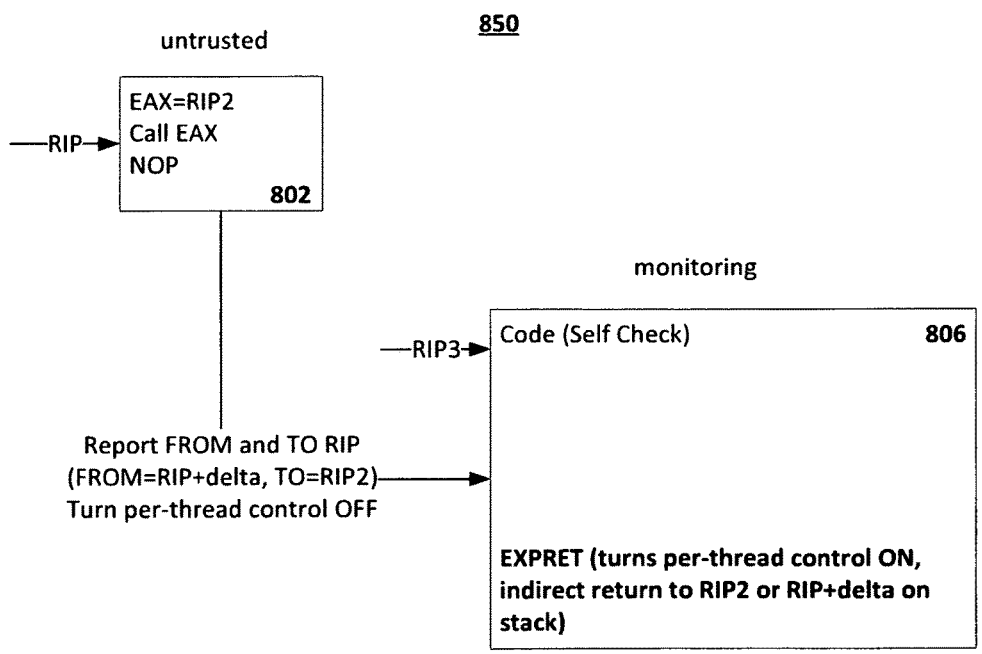

FIGS. 8A and 8B are schematic block diagrams of an example software implementation of execution profiling in accordance with embodiments of this disclosure. FIGS. 7 and 8A and 8B are discussed together.

For context, FIG. 8A shows a branch instruction 802 with an instruction pointer RIP pointing to the branch instruction and an instruction pointer RIP2 pointing to the memory location for executing the next code instruction. When EXP-C is inactive, the branch instruction is executed normally (804), and the instruction pointer RIP2 points to the new memory location for executing the code instruction.

In FIG. 8B, EXP-C is activated (prior to executing the branch instruction 802). The indirect branch 802 is identified, which includes the indirect branch (Call EAX) and the location of the indirect branch instruction (EAX=RIP2). In some implementations, the memory allocation can also be identified in a similar way: when a memory allocation is requested, EXP-C can redirect or intercept the execution and execute a different register address (from MSR) to activate the EXP-C handler.

Turning briefly to FIG. 7, the retirement logic 706 is informed of executed operation, such as the indirect branch call 802 or a memory allocation. The branch filter logic 708 can be programmed with necessary information for identifying indirect branch calls. For example a model specific register (MSR) filter 722 can be used by the branch filtering logic 708 to provide filtering criteria necessary for the branch filtering logic 708 to types distinguish between different of calls (e.g., far indirect branches, near indirect branches, unconditional indirect jumps, far indirect jumps, near indirect returns, etc.). In the context of FIG. 8B, the branch filtering logic 708 creates an indirect branch event in the EXP-C and provides the EXP-C microcode with RIP2 address of the indirect branch. The RIP2 information comes in from the retirement logic 706 from the indirect branch execution. The EXP-C microcode 710 can then instruct the CPU frontend to drive execution of the indirect branch to another register address, RIP3 in this case.

The EXP-C microcode receives the RIP3 address from the registers set 720, which is a register address for executing code by the malware handler. Additionally, the instruction pointer state information is stored on the stack (here, RIP+delta and RIP2 are stored on the stack). The CPU front end 712 then drives execution of the indirect branch to RIP3. The malware handler can then inject code into the RIP3 address space for execution.

Returning to FIG. 8B, the RIP3 points to the address space for the malware handler execution. After the malware handler runs, the EXPRET can run. EXPRET turns on per-thread control (which was turned off prior to running malware handler). The EXPRET then performs an indirect branch to the RIP2 (to execute the original indirect branch) or returns to RIP+delta, which is the next instruction after the EAX (in this case, the NOP in 802).

Among the events that the EXP-C can monitor include a request for memory allocation. The EXP-C can intercept the request for memory allocation to redirect execution to the EXP-C handler. The EXP-C handler then updates the memory allocation tracking metadata to update permissible memory conditions (e.g., metadata about the size of the memory allocation, the source of the memory allocation, and the memory locations). The EXP-C can also intercept indirect branches occurring within the monitored process code. If the indirect wants to change the permissions, the EXP-C handler can look up the metadata and block the conversion of memory to execute based on what the metadata indicates (e.g., the memory is in use, unavailable, reserved, etc.). In some embodiments, the EXP-C handler can invoke the hypervisor to block memory conversion based on the extended page table (EPT).

If there is an execution of an exploit, the EXP-C handler can also block execution of memory tracked in the memory allocation tracking metadata based on what the metadata indicates (e.g., the memory is in use, unavailable, reserved, etc.).

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Example 1 is a computer program product tangibly embodied on non-transient computer readable media. The computer program product comprising instructions operable when executed to intercept, by an execution profiling handler implemented at least partially in hardware, an invocation by an executable application to a memory allocation library; observe, by the execution profiling handler, memory allocation information associated with the invocation of the memory allocation library; and store, by the execution profiling handler, memory allocation meta-data associated with the memory allocation information.

Example 2 may include the subject matter of example 1, wherein the instructions are further operable when executed to set a permission for accessing heap memory in an extended page table based on the observed memory allocation information.

Example 3 may include the subject matter of any of examples 1 or 2, wherein the instructions are further operable when executed to intercept an indirect branch execution from the executable application; determine whether to permit or block the indirect branch execution from accessing heap memory based on the memory allocation meta-data.

Example 4 may include the subject matter of any of examples 1 or 2 or 3, wherein the instructions are further operable to block, by the execution profiling handler, the indirect branch execution from accessing heap memory based on a permission set in an extended page table.

Example 5 may include the subject matter of example 1, wherein the instructions are further operable when executed to intercept an exploitation of heap memory; and determine whether to permit or block the exploitation of heap memory based on the meta-data.

Example 6 may include the subject matter of example 1 or 5, wherein the instructions are further operable when executed to block, by the execution profiling handler, an exploitation of heap memory based on a permission in an extended page table.

Example 7 may include the subject matter of example 1, wherein memory allocation meta-data comprises one or more of memory location, memory size, memory address, memory access type, or type of process.

Example 8 may include the subject matter of example 1, wherein the instructions are further operable when executed to build a memory allocation tracking library for the executable application by iteratively intercepting memory allocation library invocations and observing memory allocation information.

Example 9 is a computer implemented method that includes intercepting, by an execution profiling handler implemented at least partially in hardware, an invocation by an executable application to a memory allocation library; observing, by the execution profiling handler, memory allocation information associated with the invocation of the memory allocation library; and storing, by the execution profiling handler, memory allocation meta-data associated with the memory allocation information.

Example 10 may include the subject matter of example 9, and also include setting a permission for accessing heap memory in an extended page table based on the observed memory allocation information.

Example 11 may include the subject matter of any of examples 9 or 10, and also include intercepting an indirect branch execution from the executable application; and determining whether to permit or block the indirect branch execution from accessing heap memory based on the memory allocation meta-data.

Example 12 may include the subject matter of example 9, and also include blocking, by the execution profiling handler, the indirect branch execution from accessing heap memory based on a permission set in an extended page table.

Example 13 may include the subject matter of example 9, and also include intercepting an exploitation of heap memory; and determining whether to permit or block the exploitation of heap memory based on the meta-data.

Example 14 may include the subject matter of example 9 or 13, and also include blocking, by the execution profiling handler, an exploitation of heap memory based on a permission in an extended page table.

Example 15 may include the subject matter of example 9, wherein memory allocation meta-data comprises one or more of memory location, memory size, memory address, memory access type, or type of process.

Example 16 may include the subject matter of example 9, wherein the instructions are further operable when executed to build a memory allocation tracking library for the executable application by iteratively intercepting memory allocation library invocations and observing memory allocation information.

Example 17 is a system for intercepting a process flow. The system can include a processor implemented at least partially in hardware; a memory; and an execution profiling handler implemented at least partially in hardware. The execution profiling handler to intercept a memory allocation library invocation; observe memory allocation information associated with the invocation of the memory allocation library; and store memory allocation meta-data associated with the memory allocation information.

Example 18 may include the subject matter of example 17, wherein the execution profiling handler to set a permission in a hypervisor implemented at least partially in hardware for accessing heap memory in an extended page table based on the observed memory allocation information.

Example 19 may include the subject matter of example 17, wherein the execution profiling handler is further configured to intercept an indirect branch execution from the executable application; and determine whether to permit or block the indirect branch execution from accessing heap memory based on the memory allocation meta-data.

Example 20 may include the subject matter of any of examples 17 or 19, wherein the execution profiling handler is configured to block the indirect branch execution from accessing heap memory based on a permission set in an extended page table.

Example 21 may include the subject matter of example 17, wherein the execution handler is further configured to intercept an exploitation of heap memory; and determine whether to permit or block the exploitation of heap memory based on the meta-data.

Example 22 may include the subject matter of any of examples 17 or 21, wherein the instructions are further operable when executed to block, by the execution profiling handler, an exploitation of heap memory based on a permission in an extended page table.

Example 23 may include the subject matter of example 17, wherein memory allocation meta-data comprises one or more of memory location, memory size, memory address, memory access type, or type of process.

Example 24 may include the subject matter of example 17, wherein the instructions are further operable when executed to build a memory allocation tracking library for the executable application by iteratively intercepting memory allocation library invocations and observing memory allocation information.

Example 25 is a computing device comprising means for intercepting an invocation by an executable application to a memory allocation library; means for observing memory allocation information associated with the invocation of the memory allocation library; and means for storing memory allocation meta-data associated with the memory allocation information.

Example 26 may include the subject matter of example 25, further comprising means for setting a permission for accessing heap memory in an extended page table based on the observed memory allocation information.

Example 27 may include the subject matter of any of examples 25 or 26, further comprising means for intercepting an indirect branch execution from the executable application; means for determining whether to permit or block the indirect branch execution from accessing heap memory based on the memory allocation meta-data.

Example 28 may include the subject matter of example 25, further comprising means for blocking the indirect branch execution from accessing heap memory based on a permission set in an extended page table.

Example 29 may include the subject matter of example 25, further comprising means for intercepting an exploitation of heap memory; and means for determining whether to permit or block the exploitation of heap memory based on the meta-data.

Example 30 may include the subject matter of example 29, further comprising means for blocking an exploitation of heap memory based on a permission in an extended page table.

Example 31 may include the subject matter of example 25, wherein memory allocation meta-data comprises one or more of memory location, memory size, memory address, or type of process.

Example 32 may include the subject matter of example 25, wherein the instructions are further operable when executed to build a memory allocation tracking library for the executable application by iteratively intercepting memory allocation library invocations and observing memory allocation information.

Advantages of the present disclosure are readily apparent to those of skill in the art. Among the various advantages of the present disclosure include the following:

Aspects of the present disclosure can identify malware that may be hidden in obscure logical branches. The present disclosure also provides a way to discover and monitor malware for applications that are not intended for the computing device executing the code. The present disclosure contemplates countering evasion techniques against API hooks and other Sandbox specifics. Execution of the full logic path means that the malware detection can be performed independent of OS, hardware specifics, or installed software packages or versions.

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer program product tangibly embodied on a non-transient computer readable medium, the computer program product comprising instructions operable, when executed, to perform a method comprising:
   intercepting, by an execution profiling handler implemented at least partially in hardware, an invocation by an executable application to a memory allocation library to allocate memory;
   observing, by the execution profiling handler, memory allocation information associated with the invocation of the memory allocation library, the memory allocation information indicating a module of the executable application that is run, a size of the memory, an address or range of the memory, an attribute of the memory, or a location of the memory, the attribute defined as at least one of READ, WRITE, or EXECUTE;
   setting a permission for accessing heap memory in an extended page table based on the memory allocation information;
   intercepting (i) an indirect branch execution from the executable application or (ii) an exploitation of heap memory; and
   determining, based on the permission set in the extended page table, to block (i) the indirect branch execution from accessing heap memory or (ii) the exploitation of heap memory.

2. The computer program product of claim 1, wherein the method further comprises:
   intercepting the indirect branch execution from the executable application; and
   determining to block the indirect branch execution from accessing heap memory based on the memory allocation information.

3. The computer program product of claim 2, wherein the indirect branch execution is blocked from accessing heap memory based on the permission set in the extended page table.

4. The computer program product of claim 1, wherein the method further comprises:
   intercepting the exploitation of heap memory; and
   determining to block the exploitation of heap memory based on the memory allocation information.

5. The computer program product of claim 4, wherein the exploitation of heap memory is blocked based on the permission in the extended page table.

6. The computer program product of claim 1, wherein the method further comprises:
   building a memory allocation tracking library for the executable application by iteratively intercepting memory allocation library invocations and observing the memory allocation information.

7. A computer implemented method, comprising:
   intercepting, by an execution profiling handler implemented at least partially in hardware, an invocation by an executable application to a memory allocation library to allocate memory;
   observing, by the execution profiling handler, memory allocation information associated with the invocation of the memory allocation library, the memory allocation information indicating a module of the executable application that is run, a size of the memory, an address or range of the memory, an attribute of the memory, or a location of the memory, the attribute defined as at least one of READ, WRITE, or EXECUTE;

setting a permission for accessing heap memory in an extended page table based on the memory allocation information;

intercepting (i) an indirect branch execution from the executable application or (ii) an exploitation of heap memory; and determining, based on the permission set in the extended page table, to block (i) the indirect branch execution from accessing heap memory or (ii) the exploitation of heap memory.

8. The computer implemented method of claim 7, further comprising:

intercepting the indirect branch execution from the executable application; and determining to block the indirect branch execution from accessing heap memory based on the memory allocation information.

9. The computer implemented method of claim 8, further comprising:

blocking, by the execution profiling handler, the indirect branch execution from accessing heap memory based on the permission set in the extended page table.

10. The computer implemented method of claim 7, further comprising:

intercepting the exploitation of heap memory; and determining to block the exploitation of heap memory based on the memory allocation information.

11. The computer implemented method of claim 10, further comprising:

blocking, by the execution profiling handler, the exploitation of heap memory based on the permission in the extended page table.

12. The computer implemented method of claim 7, further comprising:

building a memory allocation tracking library for the executable application by iteratively intercepting memory allocation library invocations and observing the memory allocation information.

13. A system for intercepting a process flow, the system comprising:

a processor implemented at least partially in hardware;
a memory; and
an execution profiling handler implemented at least partially in hardware to intercept a memory allocation library invocation by an executable application to allocate memory;

observe memory allocation information associated with the invocation of the memory allocation library, the memory allocation information indicating a module of the executable application that is run, a size of the memory, an address or range of the memory, an attribute of the memory, or a location of the memory, the attribute defined as at least one of READ, WRITE, or EXECUTE;

set a permission for accessing heap memory in an extended page table based on the memory allocation information;

intercept (i) an indirect branch execution from the executable application or (ii) an exploitation of heap memory; and determine, based on the permission set in the extended page table, to block (i) the indirect branch execution from accessing heap memory or (ii) the exploitation of heap memory.

14. The system of claim 13, wherein the permission is set in a hypervisor implemented at least partially in hardware.

15. The system of claim 13, wherein the execution profiling handler is further configured to:

intercept the indirect branch execution from the executable application; and determine to block the indirect branch execution from accessing heap memory based on the memory allocation information.

16. The system of claim 15, wherein the execution profiling handler is configured to block the indirect branch execution from accessing heap memory based on the permission set in the extended page table.

17. The system of claim 13, wherein the execution profiling handler is further configured to:

intercept the exploitation of heap memory; and determine to block the exploitation of heap memory based on the memory allocation information.

18. The system of claim 17, wherein the execution profiling handler is further configured to block an exploitation of heap memory based on the permission in the extended page table.

19. The system of claim 13, wherein a memory allocation tracking library for the executable application is built by iteratively intercepting memory allocation library invocations and observing the memory allocation information.

* * * * *

UNITED STATES PATENT AND TRADEMARK OFFICE
CERTIFICATE OF CORRECTION

PATENT NO. : 10,289,570 B2
APPLICATION NO. : 14/998201
DATED : May 14, 2019
INVENTOR(S) : Xiaoning Li et al.

Page 1 of 1

It is certified that error appears in the above-identified patent and that said Letters Patent is hereby corrected as shown below:

In the Drawings

Drawing Sheet 7 of 10, Reference Numeral 502 within Fig. 5, delete "Tranceiver" and insert -- Transceiver --, therefor.

Signed and Sealed this
Twenty-seventh Day of August, 2019

Andrei Iancu
*Director of the United States Patent and Trademark Office*